PANORAMIC RECEIVER

Filed Aug. 6, 1945

Inventors

JOSEPH M. KELLY
GILBERT J. PERLOW

By Ralph L. Chappell

Attorney

Patented Oct. 14, 1952 2,614,214

UNITED STATES PATENT OFFICE 2,614,214

PANORAMIC RECEIVER

Gilbert J. Perlow, Washington, D. C., and
Joseph M. Kelly, Arlington, Va.

Application August 6, 1945, Serial No. 609,300

5 Claims. (Cl. 250—20)

(Granted under the act of March 3, 1883, as amended April 30, 1928; 370 O. G. 757)

This invention relates to panoramic radio receiving systems.

An object of the invention is to provide a panoramic receiver including means whereby a small fractional variation of local oscillator frequency tunes the receiver through a proportionately larger band of signal frequencies.

Another object of the invention is to provide a panoramic receiver which is tuned through a band of frequencies by a proportionately smaller change of local oscillator frequency.

The invention provides a superheterodyne type of receiver with means periodically tuning the receiver through a wide band of signal frequencies by variation of the difference between the frequencies of two local oscillators and synchronously varying the horizontal deflection of the beam of a cathode-ray tube. Additionally, the vertical beam deflection is varied in accordance with the amplitude of received signals. The resulting trace on the screen of the cathode-ray tube is a plot of amplitude vs. frequency of received signals. In an exemplary embodiment, the local oscillators are operative at frequencies of the order of ten times the low frequency limit of the desired signal frequency band and the intermediate frequency is of the order of one-tenth of the low frequency limit of the band.

Figure 1:
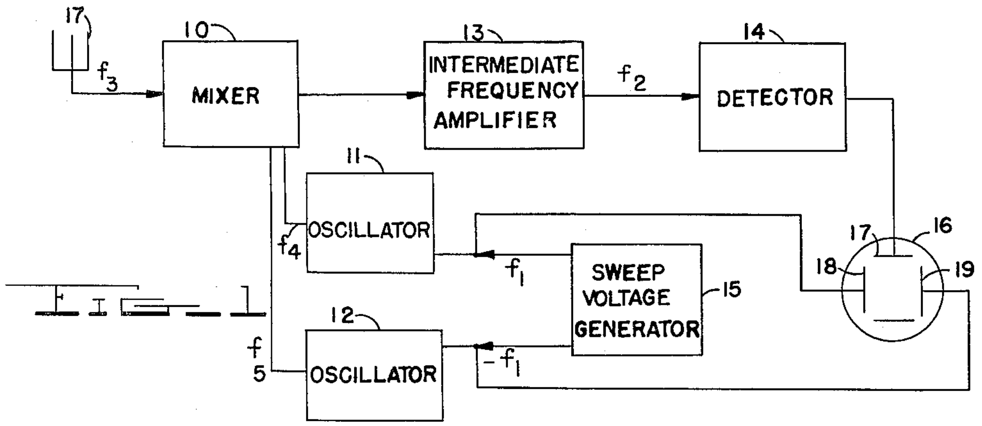
Figures 2, 3:
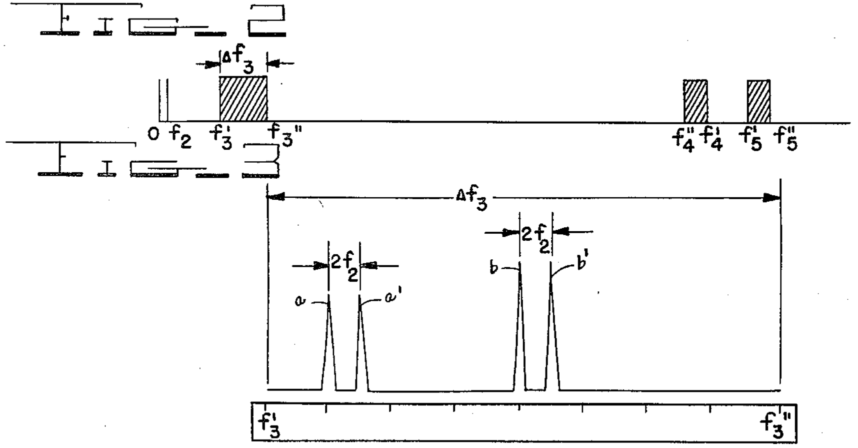
Figure 4:
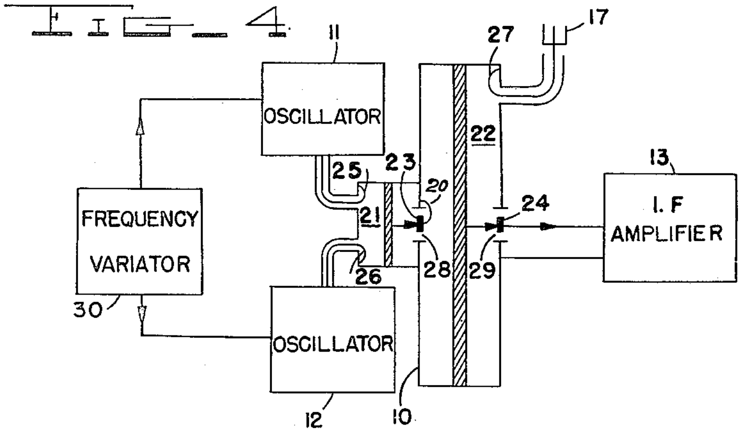

A better understanding of the invention may be had by reference to the following description and to the accompanying drawing, in which Fig. 1 is a block diagram of a panoramic receiver in accordance with the invention, Fig. 2 is a diagram showing the relative distribution in the frequency spectrum of the several frequencies involved in the operation of the invention, Fig. 3 is a graph showing the form of visual indication produced by the invention, and Fig. 4 is a diagram showing an embodiment of mixer 14 and its relationship to other components of the system.

Referring now to Fig. 1, there is shown a block diagram of a panoramic receiver in accordance with the invention comprising a mixer 10, two local oscillators 11, 12, an intermediate frequency amplifier 13, a detector 14, a sweep voltage generator 15, and a cathode-ray tube 16.

Before proceeding with a more detailed description of the invention and its components, the function of the receiver will be summarized with further reference to Figs. 2 and 3. The receiver produces a visual indication in two coordinates of the relative amplitude and frequency, respectively, of signals received within a wide band of frequencies, designated as $\Delta f_3$ in the spectrum diagram of Fig. 2. Fig. 3 illustrates the form of visual indication produced on the screen of cathode-ray tube 16 when two signals $a$ and $b$, of different amplitudes, are received within the band $\Delta f_3$. The abscissa of the curve of Fig. 3 may be calibrated directly in terms of frequency within the limits $f'_3$ to $f''_3$ of the frequency band $\Delta f_3$. The receiver is tuned through the band $\Delta f_3$ at a sweep frequency $f_1$ sufficiently high so that no appreciable flicker of the indication is observable. Thirty cycles per second is a satisfactory sweep frequency. Each received signal produces two vertical deflections $a$, $a'$ and $b$, $b'$ which are separated by a frequency $2f_2$, $f_2$ being the intermediate frequency. The ordinate of Fig. 3 is a function of the amplitude of the received signal.

The operation of the invention will be considered first on the assumption that the sweep voltage generator 15 is inoperative, so that oscillators 11, 12 oscillate at constant frequencies $f'_4$ and $f'_5$, respectively. The intermediate frequency amplifier 13 contains circuits selectively tuned to the intermediate frequency $f_2$, which is of the order of one-tenth of the desired signal frequency $f'_3$. The oscillator frequencies $f'_4$ and $f'_5$ are of the order of ten times the desired signal frequency $f'_3$. The mixer 10 then produces an output voltage having a component of frequency $f_2$ when $$(f'_5-f'_4)=f'_3\pm f_2 \quad (1)$$

That is, the receiver is tuned to a desired frequency by adjusting the difference between the frequencies of the two oscillators 11 and 12.

Furthermore, the receiver may be tuned to the upper frequency limit $f''_3$ of the desired band $\Delta f_3$ by increasing the difference between the frequencies of the two oscillators. Preferably, the frequency increments of the two oscillators, $\Delta f_5$ and $\Delta f_4$, are made equal and opposite in sign so that $$(f'_5+\Delta f_5)-(f'_4+\Delta f_4)=f''\pm f_2 \quad (2)$$

Then, by subtraction of (1) from (2)

$$\Delta f_5-\Delta f_4=f''_3-f'_3 \quad (3)$$

and since $$\Delta f_5=-\Delta f_4 \quad (4)$$

$$\Delta f_4=-\frac{f''_3-f'_3}{2} \quad (5)$$

Also, if $$f'_4=10f'_3 \quad (6)$$

the fractional increment of $f_4$ is $$\frac{\Delta f_4}{f_4}=\frac{1}{20}\,\frac{f''_3-f'_3}{f_3} \quad (7)$$

which shows that the change of oscillator frequency $f_4$, required to tune the receiver through a given signal frequency band is proportionately much less than the width of the band. Since the oscillator 12 operates at a frequency $f_5$ which is greater than $f_4$, the proportional change of frequency of oscillator 12 is slightly less than that of oscillator 11.

The sweep voltage generator 15 functions to generate a periodic sweep voltage, preferably having a triangular waveform, of fundamental frequency $f_1$. Assuming now that the sweep voltage generator 15 is operative, the sweep voltage is applied in opposite phase relationship to oscillators 11 and 12 respectively in such manner as to cause the frequencies of said oscillators to change continuously in accordance with the amplitude of said sweep voltage, thereby tuning the receiver continuously through the signal frequency band $\Delta f_3$. As the receiver is tuned through the frequency of received signals, the mixer produces an output voltage having a component of intermediate frequency $f_2$ which is amplified by intermediate frequency amplifier 13 and applied to detector 14. Detector 14 produces a unidirectional voltage in accordance with the envelope of the intermediate frequency voltage and said unidirectional voltage is applied to the vertical deflection means, such as plate 17, of cathode-ray tube 16, thereby deflecting the electron beam in a vertical direction on the screen of tube 16. The output voltage of the sweep voltage generator 15 is applied to the horizontal deflecting means, such as plates 18, 19 of tube 16, so that the horizontal position of the beam is an indication of the frequency to which the receiver is tuned. As is shown in Fig. 3, the frequency and amplitude of received signals $a$, $b$ are indicated by the horizontal and vertical coordinates, respectively, of the peaks $a$ and $b$ or $a'$ and $b'$. Each received signal produces a double peak due to the fact that the input circuit of the mixer is necessarily of low Q and thus cannot discriminate against image frequencies. However, when the intermediate frequency $f_2$ is sufficiently low, the frequency separation, $2f_2$, between the two peaks is a small percentage of the signal frequency band width, $\Delta f_3$, and the double peaks are separated by only a very small distance on the screen of tube 16. The shape of the peaks is determined by the band width of the intermediate frequency amplifier 13 and its associated selective circuits, and by the band width of the detector output circuit components. The design requirements for these circuits will be apparent to persons skilled in the art.

Several methods of accomplishing the required variation of the oscillator frequencies $f_4$, $f_5$ in response to the sweep voltage are known to the art. For example, at ultra-high frequencies the oscillators 11, 12 may be of the reflex klystron type, the sweep voltage being superimposed on the normal steady voltage applied to the reflector plate. At lower frequencies, the sweep voltage may be applied to the grid of a reactance tube connected across the tank circuit of any conventional oscillator. Mechanical means may also be used to effect the required frequency variation without departing from the scope of the invention.

Referring now to Figure 4, an exemplary embodiment of the mixer 10 will be described. The mixer 10 may comprise a first resonator 21 tuned to the mean frequency of the oscillators 11, 12, a second resonator 22 tuned to the mean signal frequency, a first crystal rectifier 23 coupled to resonator 21, a loop 20 comprising a portion of the output circuit of the crystal 23 and coupling said output circuit to the second resonator 22, a second crystal rectifier 24 coupling second resonator 22 to the intermediate frequency amplifier 13, means comprising loops 25, 26 coupling the output energy of oscillators 11 and 12, respectively, to the first resonator, and means comprising loop 27 coupling the signal energy from antenna 17 to the second resonator. A frequency variator 30 operates to vary the frequencies $f_4$, $f_5$ of oscillators 11, 12. The crystal rectifier 23 constitutes a non-linear impedance, causing a plurality of frequencies to appear in its output circuit, including the desired frequency, $f_4-f_5$, equal to the difference between the frequencies of oscillators 11, 12. The desired frequency, $f_4-f_5$, is coupled to the resonator 22 by means of loop 20, while the undesired frequencies are by-passed by means of the capacitance 28 between the crystal 23 and its holder. The combination of the signal energy and the output energy of crystal 23 applied to resonator 22 is applied to crystal rectifier 24 to produce output energy from the crystal 24 having the desired frequency component $f_2$ corresponding to the difference between $f_5-f_4$ and the signal frequency. The higher frequency components of the output of crystal 24 are by-passed by the capacitance 29 and the desired frequency $f_2$ is applied to the intermediate frequency amplifier 13, tuned to $f_2$. The resonators 21, 22 will normally have a low Q in order to provide a reasonably uniform response over the bands of frequencies involved in their operation as hereinbefore described. The principles of design of such resonators are well known in the art.

While we have described herein the principles of our invention, it is to be clearly understood that this description is made only by way of example and not as a limitation on the scope of our invention as set forth in the appended claims.

The invention described herein may be manufactured and used by or for the Government of the United States of America for governmental purposes without the payment of any royalties thereon or therefor.

We claim:

1. A panoramic radio frequency receiving system, comprising a pair of local oscillators each operative at a distinct frequency several times higher than the incoming signal frequency, mixer means combining the difference frequency energy of said oscillators with the incoming signals to produce a heterodyne output, a cathode ray tube indicator receiving said heterodyne output, and means sweeping the beam of said cathode ray tube across the face thereof and synchronously varying the frequency of said local oscillators in opposed directions.

2. A panoramic radio frequency receiving system, comprising a pair of local oscillators each operative at a distinct frequency several times higher than the incoming signal frequency, mixer means combining the difference frequency energy of said oscillators with the incoming signals to produce a heterodyne output, a cathode ray tube indicator, an intermediate frequency amplifier channel tuned to a frequency much lower than the incoming signal frequency coupling the output of said mixer to said cathode ray tube, and means sweeping the beam of said cathode ray tube across the face thereof and synchronously varying the frequency of said local oscillators in opposed directions.

3. A panoramic radio frequency receiving system comprising a pair of variable frequency local oscillators, first mixer means combining the output signals of said oscillators to derive a heterodyne output signal, second mixer means combining said heterodyne output signal with the incoming signals to derive a second heterodyne output signal, a cathode ray tube indicator receiving said second heterodyne output signal, and means sweeping the beam of said cathode ray tube across the screen thereof and synchronously varying the frequency of both of said local oscillators.

4. A panoramic radio frequency receiving system, comprising a pair of variable frequency local oscillators each operating at a distinct frequency, first mixer means combining the output signals of said oscillators to derive a beat frequency difference signal from said oscillators, second mixer means combining said beat frequency difference signal with the incoming signals to derive a heterodyne output signal, a cathode ray tube indicator receiving said heterodyne output signal, and means sweeping the beam of said cathode ray tube across the screen thereof and synchronously varying the frequency of both of said local oscillators in opposed directions.

5. A sweep frequency generator comprising a pair of oscillators each including frequency control means incorporated therein, mixer means coupled to said oscillators to receive the outputs therefrom and to deliver a heterodyne output signal, and a sweep frequency control means coupled to the frequency control means of both of said oscillators for synchronously varying the frequencies of both of said oscillators in opposed directions.

GILBERT J. PERLOW.
JOSEPH M. KELLY.

REFERENCES CITED

The following references are of record in the file of this patent:

UNITED STATES PATENTS

| Number | Name | Date |
|---|---|---|
| 1,994,232 | Schuck | Mar. 12, 1935 |
| 2,111,764 | Foster | Mar. 22, 1938 |
| 2,203,750 | Sherman | June 11, 1940 |
| 2,262,149 | Slonczewski | Nov. 11, 1941 |
| 2,270,023 | Ramsay et al. | Jan. 13, 1942 |
| 2,367,907 | Wallace | Jan. 23, 1945 |
| 2,408,858 | Keizer | Oct. 8, 1946 |
| 2,421,771 | Browning | June 10, 1947 |
| 2,502,294 | Wallace | Mar. 28, 1950 |

FOREIGN PATENTS

| Number | Country | Date |
|---|---|---|
| 570,390 | Great Britain | July 5, 1945 |